United States Patent
Davi

(10) Patent No.: US 11,539,609 B2
(45) Date of Patent: Dec. 27, 2022

(54) METHOD AND APPARATUS FOR REPORTING POWER DOWN EVENTS IN A NETWORK NODE WITHOUT A BACKUP ENERGY STORAGE DEVICE

(71) Applicant: Trilliant Networks, Inc., Cary, NC (US)

(72) Inventor: Gregory Davi, Tracy, CA (US)

(73) Assignee: Trilliant Networks, Inc., Cary, NC (US)

( * ) Notice: Subject to any disclaimer, the term of this patent is extended or adjusted under 35 U.S.C. 154(b) by 0 days.

(21) Appl. No.: 16/561,655

(22) Filed: Sep. 5, 2019

(65) Prior Publication Data

US 2020/0084129 A1 Mar. 12, 2020

Related U.S. Application Data

(60) Provisional application No. 62/729,592, filed on Sep. 11, 2018.

(51) Int. Cl.
*H04L 43/10* (2022.01)
*H04L 43/12* (2022.01)
(Continued)

(52) U.S. Cl.
CPC .......... *H04L 43/10* (2013.01); *H04L 43/0805* (2013.01); *H04L 43/12* (2013.01); *H04L 67/1061* (2013.01); *H04W 84/18* (2013.01)

(58) Field of Classification Search
CPC ........ A61B 8/56; H04W 84/18; H04W 84/08; H04W 84/005; H04W 84/12;
(Continued)

(56) References Cited

U.S. PATENT DOCUMENTS 5,710,885 A * 1/1998 Bondi ............... H04L 41/12
709/224
7,209,840 B2 * 4/2007 Petite ............... H04Q 9/00
702/62

(Continued)

FOREIGN PATENT DOCUMENTS

KR 20100134042 A 12/2010
WO WO 2020/055711 3/2020
WO WO 2020/117732 6/2020

OTHER PUBLICATIONS

Ramanathan, Mar. 2005 "Ad Hoc Networking With Directional Antennas: A Complete System Solution", IEEE Journal, vol. 23, pp. 496-506 (Year: 2005).*

(Continued)

*Primary Examiner* — John M MacIlwinen
*Assistant Examiner* — Rachel J Hackenberg
(74) *Attorney, Agent, or Firm* — Moser Taboada

(57) ABSTRACT

A computer implemented method and apparatus for reporting power down events in mesh nodes without a backup energy storage device. The method comprises reporting power down events in mesh nodes without a backup energy storage device comprising: listening, by a powered node in a network, for a heartbeat of a neighboring node, wherein the neighboring node does not have a backup energy storage device; pinging the neighboring node when a heartbeat is not heard within a predefined time period; and sending, by the powered node, a message toward a head end server indicating a power down event of the neighboring node.

17 Claims, 5 Drawing Sheets

(51) Int. Cl.
*H04W 84/18* (2009.01)
*H04L 67/1061* (2022.01)
*H04L 43/0805* (2022.01)

(58) Field of Classification Search
CPC ... H04W 84/22; H04W 84/182; H04W 84/10; H04W 84/16; H04W 24/08; H04W 24/02; H04W 24/04; H04W 24/00; H04W 52/02; H04W 52/0277; H04W 92/045; H04L 43/10; H04L 43/0805; H04L 43/16; H04L 43/04; H04L 43/0811; H04L 43/0817; H04L 43/028; H04L 43/12; H04L 67/1061; H04L 67/02; H04L 67/029; H04L 67/2838; H04L 67/1021; H04L 63/0272

See application file for complete search history.

(56) References Cited

U.S. PATENT DOCUMENTS

| | | | | |
|---|---|---|---|---|
| 7,421,478 | B1* | 9/2008 | Muchow | G06F 9/44505 709/209 |
| 8,014,329 | B2* | 9/2011 | Gong | H04W 40/005 370/311 |
| 8,042,147 | B2* | 10/2011 | Byres | H04L 67/34 726/1 |
| 8,223,783 | B2* | 7/2012 | Shorty | H04L 12/10 370/406 |
| 8,407,758 | B2* | 3/2013 | Byres | H04L 41/0806 726/1 |
| 8,508,367 | B2* | 8/2013 | Shafer | G06Q 10/08 340/571 |
| 9,632,850 | B1* | 4/2017 | Emam | G06F 9/542 |
| 9,960,951 | B1 | 5/2018 | Cruickshank et al. | |
| 10,142,241 | B1* | 11/2018 | VanLoon | H04L 47/27 |
| 10,257,295 | B1* | 4/2019 | Alpert | H04L 63/1425 |
| 10,547,516 | B2* | 1/2020 | Singh | H04L 67/10 |
| 2001/0056503 | A1* | 12/2001 | Hibbard | G06F 11/2012 709/250 |
| 2007/0064667 | A1* | 3/2007 | Rensburg | H04W 72/085 370/346 |
| 2007/0198700 | A1* | 8/2007 | Vivian | G06F 11/2023 709/224 |
| 2007/0294392 | A1* | 12/2007 | Balasubramanian | G06F 9/542 709/224 |
| 2009/0010190 | A1 | 1/2009 | Gong | |
| 2010/0177708 | A1* | 7/2010 | Pandey | H04W 56/00 370/329 |
| 2013/0145010 | A1* | 6/2013 | Luna | H04L 47/70 709/223 |
| 2016/0021013 | A1* | 1/2016 | Vasseur | H04L 47/20 370/235 |
| 2016/0043827 | A1 | 2/2016 | Filson et al. | |
| 2016/0364648 | A1 | 12/2016 | Du et al. | |
| 2018/0089014 | A1* | 3/2018 | Smith | G06F 11/0751 |
| 2018/0167224 | A1 | 6/2018 | Brandt | |
| 2018/0375828 | A1* | 12/2018 | Rawat | H04L 63/0209 |
| 2020/0186415 | A1* | 6/2020 | Cardozo | H04L 41/0677 |
| 2020/0329120 | A1* | 10/2020 | Preveraud | G06F 8/71 |
| 2021/0058194 | A1* | 2/2021 | Nilsson | H04W 80/02 |
| 2021/0117150 | A1* | 4/2021 | Hussain | G10L 15/22 |

OTHER PUBLICATIONS

Bilal Mouneir Saeed Eid, "Microgrid multi-distributed energy resources for power management network stability", In: Thesis (PhD) Faculty of Engineering, University of Malaya, 2016.

International Search Report and Written Opinion Of The International Searching Authority dated Dec. 26, 2019 for PCT Application No. PCT/US2019/050133.

Examination Report from the UK Intellectual Property Office for application No. GB2103377.4 dated Mar. 24, 2022, 5 pgs.

Supplementary European Search Report for application No. EP19859278.4, dated May 11, 2022, 14 pgs.

\* cited by examiner

METHOD AND APPARATUS FOR REPORTING POWER DOWN EVENTS IN A NETWORK NODE WITHOUT A BACKUP ENERGY STORAGE DEVICE

CROSS-REFERENCE TO RELATED APPLICATIONS

This application claims priority to U.S. Provisional Patent Application Ser. No. 62/729,592 filed Sep. 11, 2018, which is incorporated by reference herein in its entirety.

BACKGROUND

Field

Embodiments of the present invention generally relate to event reporting and more specifically, to a method for reporting power down events in mesh nodes without a backup energy storage device.

Description of the Related Art

A mesh network is a wireless network configured to route data between nodes within a network. It allows for continuous connections and reconfigurations around broken or blocked paths by retransmitting messages from node to node until a destination is reached. Mesh networks differ from other networks in that the component parts can all connect to each other via multiple hops. Thus, mesh networks are self-healing: the network remains operational when a node or a connection fails.

Advanced Metering Infrastructure (AMI) or Advanced Metering Management (AMM) are systems that measure, collect and analyze utility usage, from advanced devices such as electricity meters, gas meters, and water meters, through a network on request or a pre-defined schedule. This infrastructure includes hardware, software, communications, customer associated systems and meter data management software. The infrastructure allows collection and distribution of information to customers, suppliers, utility companies and service providers. This enables these businesses to either participate in, or provide, demand response solutions, products and services.

A meter may be installed on a power line, gas line, or water line and wired into a power grid for power. During a power outage or other "not reporting" state, the meter may cease to function. When power is restored, meter functionality may be restored. A meter typically includes a backup energy storage device, which works as a backup power supply to provide the meter with enough power to report itself as being in a power down mode (i.e., a last gasp). However, backup energy storage devices, such as supercapacitors are expensive and bulky. Having a backup energy storage device in every meter in the network is expensive and the costs may ultimately be passed on the customer. However, a requirement in mesh networks requires meters to support a last gasp feature or other technique to notify the Outage management Systems (OMS) in a Utility.

Currently, a device is determined to be in a "Not Reporting" state based on a configurable timer based on a meter's periodic timer and collector expectations. In practice, this can be intermittent and delayed by the network periodic heartbeat. In practice, calling a device "Not Reporting" on the first lost heartbeat from the collector which is a User Datagram Protocol (UDP)-like packet traversing N-hops up to the collector is aggressive when network packet success is less than 90%, causing false positives. In practice, the heartbeat frequency is low (i.e., hourly heartbeats) to reduce network traffic overhead. Probing by the network, its nodes, or any other software is not currently performed, thereby requiring the outage management system (OMS) to probe devices.

Therefore, there is a need for a method and apparatus for reporting power down events in mesh nodes without a backup energy storage device.

SUMMARY

An apparatus and/or method is provided for reporting power down events in mesh nodes without a backup energy storage device substantially as shown in and/or described in connection with at least one of the figures. The method for reporting power down events in mesh nodes without a backup energy storage device includes listening, by a powered node in a network, for a heartbeat of a neighboring node, wherein the neighboring node does not have a backup energy storage device; pinging the neighboring node when a heartbeat is not heard within a predefined time period; and sending, by the powered node, a message toward a head end server indicating a power down event of the neighboring node.

Other and further embodiments of the present invention are described below.

Figure 1:
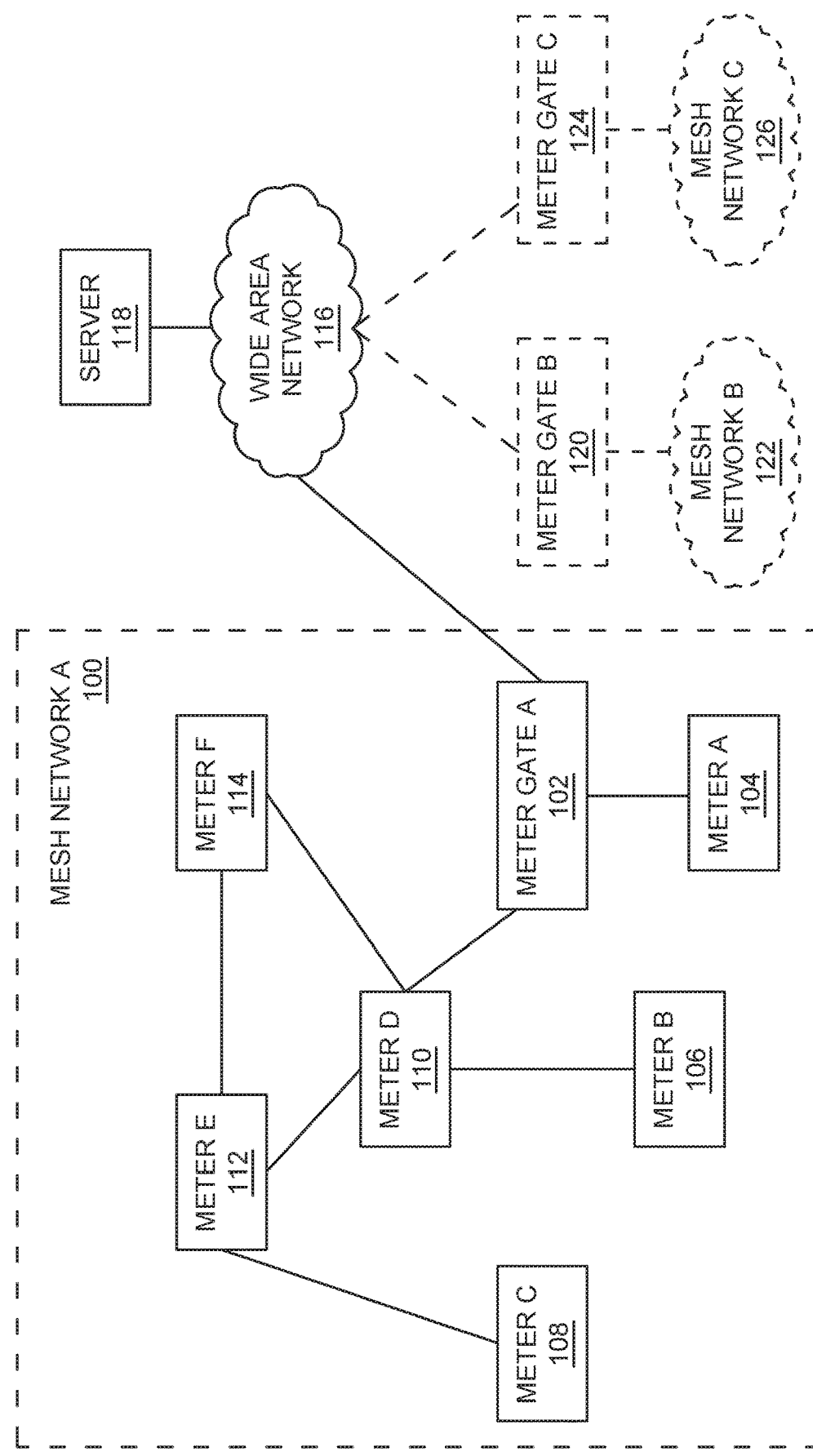
FIG. 1 depicts a block diagram of an exemplary smart grid system for reporting power down events in mesh nodes without a backup energy storage device, according to one or more embodiments of the invention.

While the method and apparatus is described herein by way of example for several embodiments and illustrative drawings, those skilled in the art will recognize that the method and apparatus for reporting power down events in mesh nodes without a backup energy storage device is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for reporting power down events in mesh nodes without a backup energy storage device defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. As used herein, a "powered node" is a node with a backup energy storage device. As used herein, a head end system (HES) is hardware and software that receives a stream of meter data brought back to a utility thorough an advanced metering infrastructure (AMI).

DETAILED DESCRIPTION OF EMBODIMENTS

Embodiments of the invention provide a system and method for reporting power down events in mesh nodes without a backup energy storage device (e.g., a supercapacitor). Each node (e.g., meter) in a network maintains of table of neighboring nodes with which the node communicates. The table may be used for various purposes with regard to communication within the network. In some embodiments, an entry exists for each neighboring node in the table with an indication of whether the neighboring node has a backup energy storage device. A node without a backup energy storage device is unable to send a notification up to the server when said node suffers a power outage. As such, a powered node (i.e., a node with a backup energy storage device) monitors all of its one or more neighboring nodes in the table that include the indication that the neighboring not does not have a backup energy storage device. The powered node listens for a heartbeat from each neighboring node without a backup energy storage device. As long as a heartbeat is continually heard from each node, no action is needed as the heartbeat indicates the node is receiving power. However, if while monitoring the neighboring node, the powered node does not hear the heartbeat from the neighboring node, then the powered node pings the neighboring node. If the neighboring node responds to the powered node, no action is needed and the powered node continues to monitor the neighboring node. In some embodiments, if the neighboring node fails to respond to the ping, the powered node determines the neighboring node is suffering a power outage event and reports the event up to the HES.

In some embodiments, an entry exists for each neighboring node in the table indicating how many communication failures are acceptable before a true failure is declared. Due to the fact that some links in the network are weak, it may not be unusual for a node to take longer to respond than another node. Due to the weak link, a node may not respond to a first ping, or a second ping, and still be fully functional. However, when said node does not respond to a third ping, then a power failure may be declared. Therefore, an acceptable number of communication failures is configured for each node based on historical response times of said node.

In some embodiments, when the powered node receives information regarding a power outage from a device, such as another powered node sending a last gasp indication of a power failure to the HES through the powered node, the powered node may proactively ping all of the devices the powered node monitors in order to determine whether any other power outages have occurred. In such instance, the powered node does not wait for the next heartbeat from a device. Rather, it proactively pings the devices, thereby reducing the time to determine a power failure of one of the monitored nodes.

In some embodiments, any disturbance on the network, received by any means, may trigger the powered node to ping the nodes it is monitoring. For example, it is normal in the course of sending communications (i.e., a packet) from one node to another, to receive an acknowledgement from the node where the communication was transmitted. A failure to receive such acknowledgement may trigger the powered node to ping the neighboring nodes it monitors. As such, fewer backup energy storage devices are required in the network due to the ability of powered nodes to monitor and report back on their neighboring nodes.

In some embodiments, a specific device in a smart grid is strategically placed next to a powered node but on a separate feeder line. The strategically placed device may be used as a trigger to send the powered node a signal that power has been lost on its circuit. When the powered node receives the alert, the powered node sends a message toward the head end system indicated the powered down status of the strategically placed node.

Advantageously, the present invention uses a neighbor node to detect lack of down node traffic (e.g., incidental data or periodic heartbeat) to provide local outage confirmation and active probing. This improves performance by improving the OMS detection delay, improving the "true positive" feedback time to the OMS down to seconds (up to the network heartbeat timer if no incidental data traffic is traversing), sending only one acknowledged event packet to the collector and/or OMS to minimize network traffic overhead, thereby avoiding increasing the regular network heartbeat traffic load from a more frequent heartbeat used to improve detection delay and avoid false positives, and lastly, in the absence of the present invention, if a network path is inhibited while trying to probe the node that is experiencing the power outage, all possible paths to the device with the power outage would need to be probed and exhausted before concluding a power outage exists, thereby creating excessive traffic in the network. In addition, the present invention recognizes outages more quickly by triggering a probe in response to any disturbance on the network, instead of waiting for a scheduled time to ping its monitored nodes.

Various embodiments of a method and apparatus for reporting power down events in mesh nodes without a backup energy storage device are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 illustrates a block diagram of a system for reporting power down events in mesh nodes without a backup energy storage device. A mesh network A 100 may include a plurality of nodes (i.e., mesh gate A 102 and a plurality of meters: meters A 104, B 106, C 108, D 110, E 112, and F 114). A mesh gate may also be referred to as a NAN-WAN gate or an access point. The mesh gate A 102 may communicate to a server 118 over a wide area network 116. Optionally, a mesh gate B 120 and a mesh network B 122 may also communicate with the server 118 over the wide area network (WAN) 116. Optionally, a mesh gate C 124 and a mesh network C 126 may also communicate with the server 118 over the wide area network 116. In one example embodiment, the server 118 is known as a "head end." The mesh gate may also be known as a collector, a concentrator, or an access point.

The mesh network A 100 may include a plurality of mesh gates and meters which cover a geographical area. The meters may communicate with the mesh gates over the mesh network. For example, the system may monitor utilities usage, such as gas, water, or electricity usage and usage patterns.

The mesh gate A 102 may provide a gateway between the mesh network A 100 and the server 118. The mesh gate A 102 may include a mesh radio to communicate with the mesh network A 100 and a WAN communication interface to communicate with a WAN.

The mesh gate A 102 may aggregate information from meters within the mesh network A 100 and transmit the information to the server 118. It will be appreciated that while only one mesh gate is depicted in the mesh network A 100, any number of mesh gates may be deployed within the mesh network A 100, for example, to improve transmission bandwidth to the server and provide redundancy. A typical system will include a plurality of mesh gates within the mesh network. In a non-limiting embodiment for an urban or metropolitan geographical area, there may be between 1 and 100 mesh gates, though this is not a limitation of the invention. In one embodiment, each mesh gate supports approximately 400 meters, depending on system requirements, wireless reception conditions, available bandwidth, and other considerations.

The meters A 104, B 106, C 108, D 110, E 112, and F 114 may each be a mesh device, such as a meter depicted below. The meters may be associated with the mesh network A 100 through direct or indirect communications with the mesh gate A 102. Each meter may forward or relay transmissions from other meters within the mesh network A 100 towards the mesh gate A. It will be appreciated that while only six meters are depicted in the mesh network A 100, any number of meters may be deployed to cover any number of utility lines or locations.

As depicted, only meters A 104 and D 110 are in direct communications with mesh gate A 102. However, meters B 106, E 112 and F 114 can all reach mesh gate A 102 through meter D 110. Similarly, meter C 108 can reach mesh gate A 102 through meter E 112 and meter D 110.

The wide area network (WAN) 116 may be any communication medium capable of transmitting digital information. For example, the WAN 116 may be the Internet, a cellular network, a private network, a phone line configured to carry a dial-up connection, or any other network.

The server 118 may be a computing device configured to receive information from a plurality of mesh networks and meters. The server 118 may also be configured to transmit instructions to the mesh networks, mesh gates, and meters.

It will be appreciated that while only one server is depicted, any number of servers may be used. For example, servers may be distributed by geographical location. Redundant servers may provide backup and failover capabilities system.

It will be appreciated that while the present disclosure depicts the invention in a WAN using one or more servers, the present invention may be performed on any device in a network including but not limited to a piece of equipment in the network, a piece of software in the cloud, any internet of things (IOT) network enabled device, and the like.

Figure 2A:
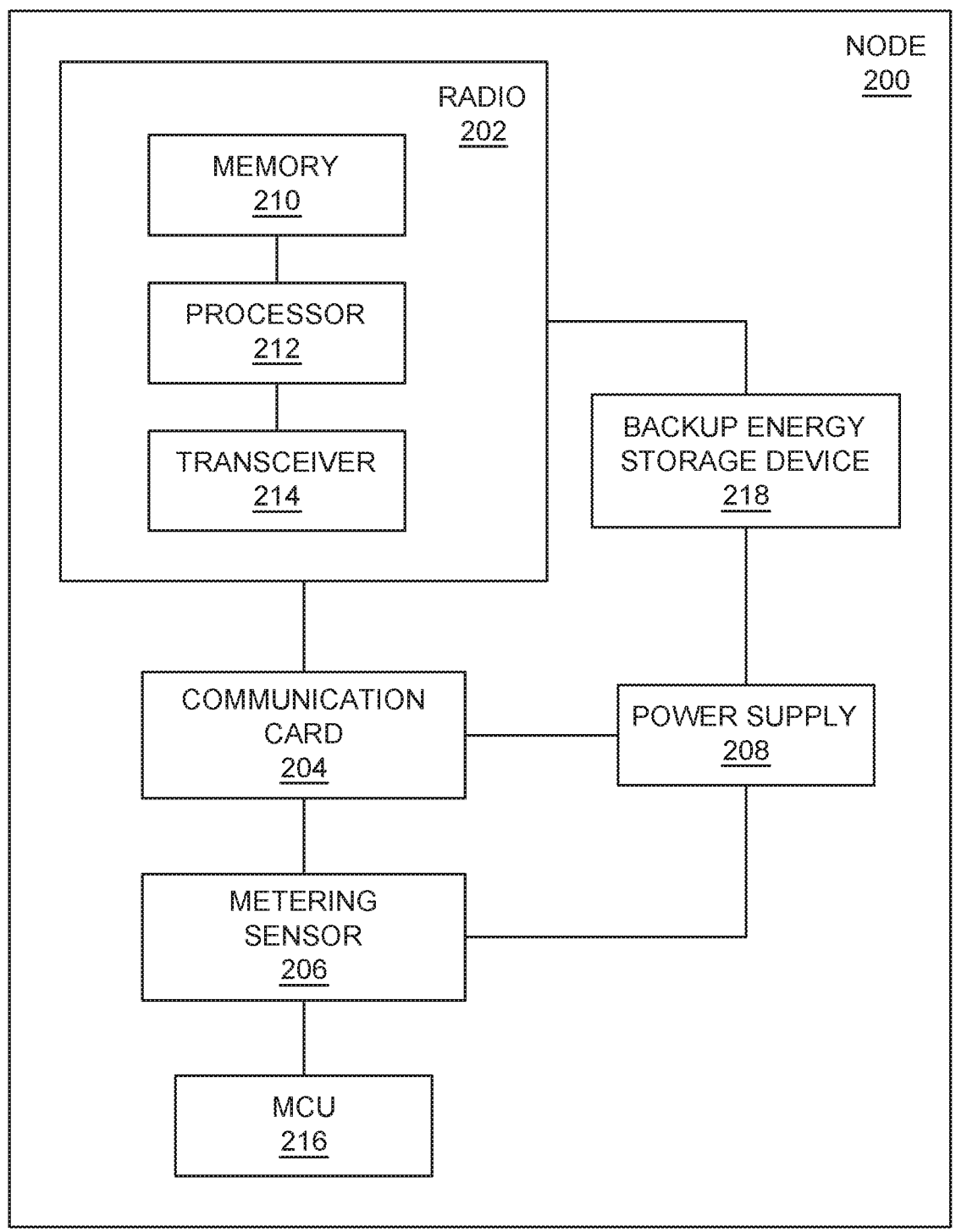
FIGS. 2A and 2B depict block diagrams of exemplary nodes (e.g., meter) for use within a mesh network, according to one or more embodiments of the invention.

FIG. 2A illustrates an exemplary node for use within a mesh network 100 according to one or more embodiments. A node 200 may include a radio 202, a communication card 204, a metering sensor 206, a power supply 208 and a backup energy storage device 218. The radio 202 may include a memory 210, a processor 212, a transceiver 214, and a microcontroller unit (MCU) 216 or other processor or processing logic.

A mesh device can be any device configured to participate as a node within a mesh network. The node 200 may be a mesh device communicating with a mesh gate and other mesh devices over a mesh network. For example, the node 200 may be a gas, water or electricity meter installed in a residential building or other location to monitor utilities usage. The node 200 may also control access to utilities on server instructions, for example, by reducing the flow of gas, water or electricity.

The radio 202 may be a mesh radio configured to communicate with a mesh network. The radio 202 may transmit, receive, and forward messages to the mesh network. Any meter within the mesh network may thus communicate with any other meter or mesh gate by communicating with its neighbor and requesting a message be forwarded.

The communication card 204 may interface between the radio 202 and the sensor 206. Sensor readings may be converted to radio signals for transmission over the radio 202. The communication card 204 may include encryption/decryption or other security functions to protect the transmission. In addition, the communication card 204 may decode instructions received from the server.

The metering sensor 206 may be a gas, water, or electricity meter sensor, or another sensor. For example, digital flow sensors may be used to measure a quantity of utilities consumed within a residence or building. Alternatively, the sensor 206 may be an electricity meter configured to measure a quantity of electricity flowing over a power line.

The power supply 208 may be configured to power the node 200. Power supplies may be used, for example, galvanic cells, electrolytic cells, fuel cells, flow cells, and voltaic cells. In addition, the backup energy storage device 218 may store electricity to power the node 200 for at least five minutes after a power outage. Small compact but high capacity capacitors known as super capacitors are known in the art and may advantageously be used. One exemplary super capacitor is the SESSCAP 50 f 2.7 v 18×30 mm capacitor.

The memory 210 of the radio 202 may store instructions and run-time variables of the radio 202. For example, the memory 210 may include both volatile and non-volatile memory. The memory 210 may also store a history of sensor readings from the metering sensor 206 and an incoming queue of server instructions. The processor 212 of the radio 202 may execute instructions, for example, stored in memory 210. Instructions stored in memory 210 may be ordinary instructions, for example, provided at time of meter installation, or special instructions received from the server during run time.

The transceiver 214 of the radio 202 may transmit and receive wireless signals to a mesh network. The transceiver 214 may be configured to transmit sensor readings and status updates under control of the processor 212. The transceiver 214 may receive server instructions from a server, which are communicated to the memory 210 and the processor 212.

The MCU 216 can execute firmware or software required by the node 200. The firmware or software can be installed at manufacture or via a mesh network over the radio 202.

In one embodiment, any number of MCUs can exist in the node 200. For example, two MCUs can be installed, a first MCU for executing firmware handling communication protocols, and a second MCU for handling applications.

Meters may be located in geographically dispersed locations. For example, a meter may be located near a gas line, an electric line, or a water line entering a building or premise to monitor a quantity of gas, electricity, or water. The meter may communicate with other meters and mesh gates through a mesh network. The meter may transmit meter readings and receive instructions via the mesh network.

Figure 2B:
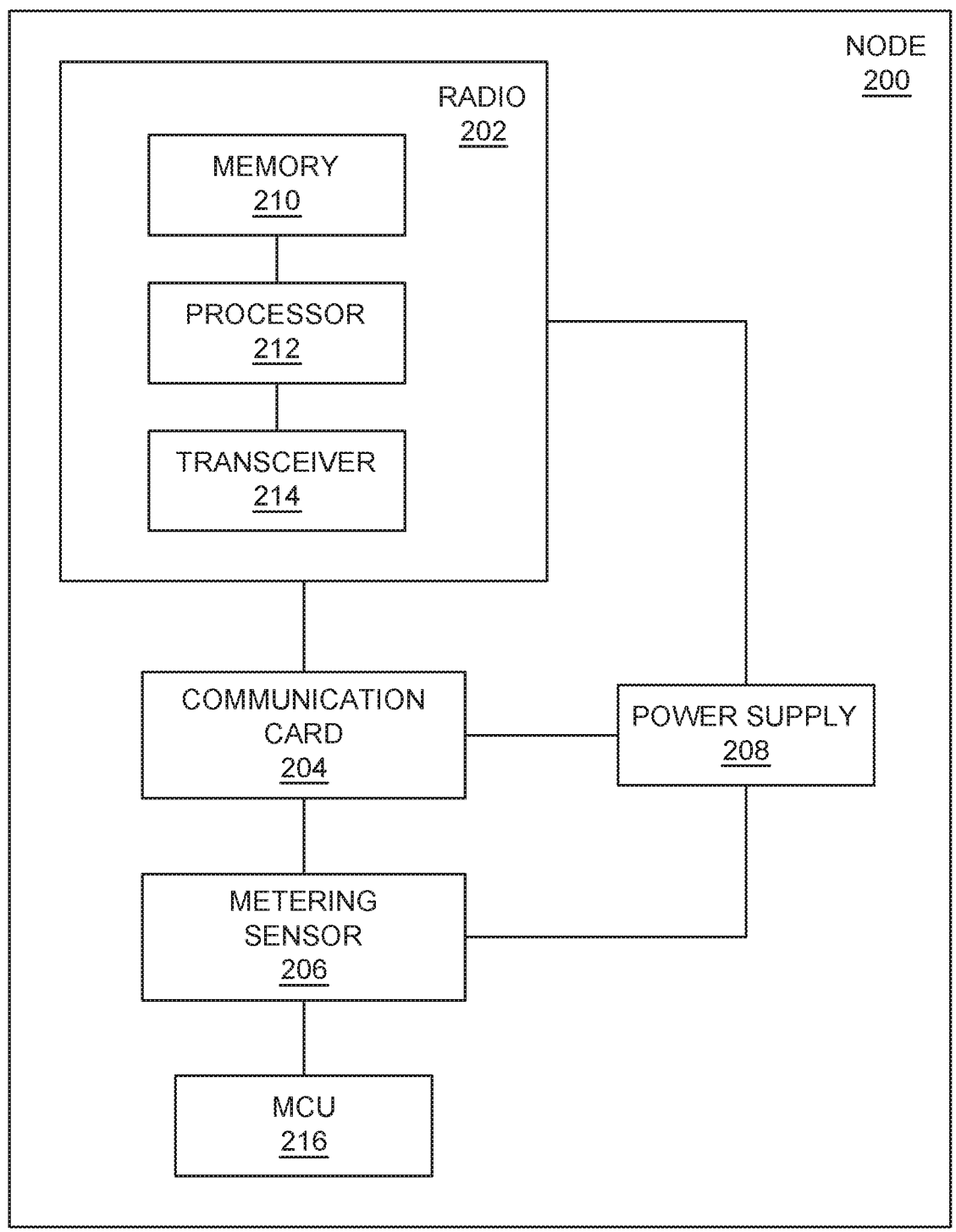

FIG. 2B illustrates an exemplary node for use within a mesh network 100 that does not use a backup energy storage device, according to one or more embodiments. A node 200 may include a radio 202, a communication card 204, a metering sensor 206, and a power supply 208. The radio 202 may include a memory 210, a processor 212, a transceiver 214, and a microcontroller unit (MCU) 216 or other processor or processing logic.

The key difference between the meter of FIG. 2A and the meter of FIG. 2B is that the meter of FIG. 2B does not include a backup energy storage device. The power supply 208 may be configured to power the node 200. Power supplies may be used, for example, galvanic cells, electrolytic cells, fuel cells, flow cells, and voltaic cells. Without the backup energy storage device the meter cannot store electricity to power the meter after a power outage.

Figure 3:
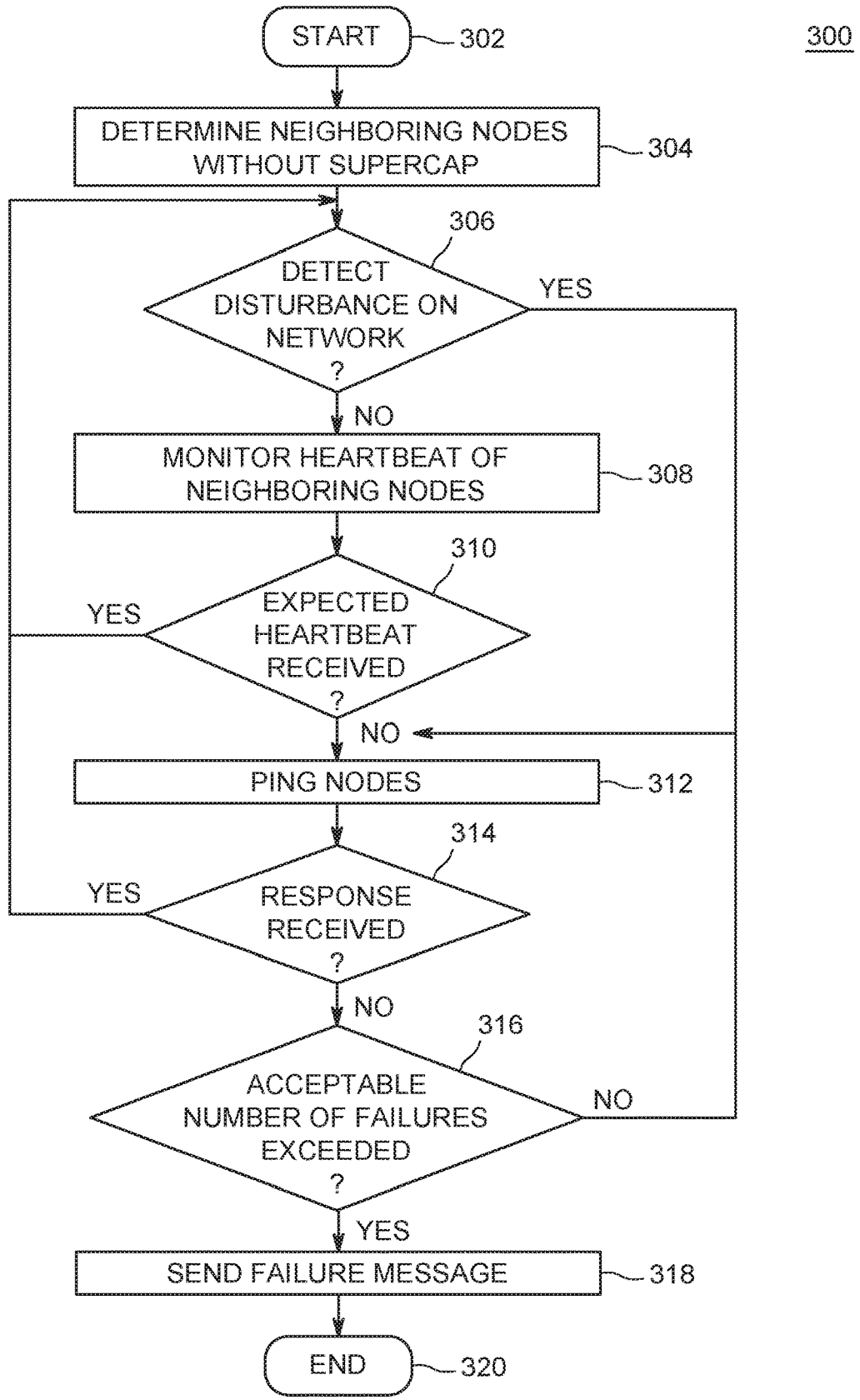
FIG. 3 depicts an flow diagram of a method for reporting power down events in mesh nodes without a backup energy storage device, according to one or more embodiments of the invention.

FIG. 3 depicts a flow diagram of a method 300 for monitoring and reporting power outage events of a network node without a backup energy storage device, according to one or more embodiments of the invention. The method 300 begins at step 302 and proceeds to step 304.

At step 304, a powered node determines whether any of its neighboring nodes need to be monitored for power outage events. Any neighboring node that does not have a backup energy storage device must be monitored as these nodes, without a backup energy storage device, cannot report that they are experiencing a power outage event. In some embodiments, a neighbor node table includes information regarding whether each neighboring node has a backup energy storage device. In some embodiments, a powered node may send with their "heartbeat" an attribute identifying itself as having a backup energy storage device. In some embodiments, each neighboring node requests from each neighbor information regarding whether the neighboring node has a backup energy storage device. It is appreciated by those skilled in the art that any manner of determining whether a network node has a backup energy storage device may be used. In some embodiments, any node may be configured to actively probe or listen to neighbors, using for example an activity table when a packet is transmitted from said neighbors to the powered device. In some embodiments, only powered nodes are configured to actively probe or listen to neighbors, using for example an activity table when a packet is transmitted from said neighbors to the powered device. In some embodiments, any node may be configured to monitor or not monitor a specific target node that does not have a backup energy storage device, thereby excluding creating of an alarm to the HES OMS for one or more nodes that do not have a backup energy storage device. In some embodiments, any node may be configured to monitor one or more high priority nodes at a higher rate than the default configuration and/or monitor one or more low priority nodes at a lower rate than the default configuration.

At step 306, it is determined whether any disturbance on the network has been detected. A disturbance may take the form of any activity out of the norm. A disturbance may include, for example, a chirp from a node that signals the node is experiencing a power outage, a lack of an acknowledgement from a node where an acknowledgement is expected, an indication from a powered node on a separate feeder line than the powered node. If it is determined that a disturbance is detected, then the method 300 proceeds to step 312. However, if it is determined that no disturbance is detected, then at step 308, the powered node monitors a heartbeat of each neighboring node that it determines does not have a backup energy storage device. During normal operation, the heartbeat is sent at regular intervals in the order of seconds from the monitored node. At step 308, the powered node determines whether too much time has passed since hearing the heartbeat from the monitored node. If the heartbeat is heard, the method 300 proceeds to step 306. However, if at step 310, a threshold time for hearing the heartbeat from the monitored node has passed, then at step 312, the powered node pings the monitored node to determine the status of the node. In some embodiments, a powered device may use its own information regarding a loss of power as an input to ping the neighboring nodes to determine the status of the node. In normal operations, the monitored node should answer the ping.

At step 314, it is determined whether the monitored node answered the ping. If the powered node receives an answer from the monitored node, then the method 300 proceeds to step 306, where the powered node continues to monitor the network. However, if at step 314, no answer is received from the monitored node, the powered node determines that a power outage has occurred and at step 314, then at step 316, it is determined whether to declare a power failure for the node. The neighbor table is accessed to determine how many communication failures are acceptable for the given node before a true failure is declared. If the acceptable number of communication failures has not been exceeded, then the method proceeds to step 312 and pings the node again until either a response is received or the acceptable number of communication failures is exceeded at which time the method 300 proceeds to step 318 and a failure message is sent. The powered node sends a message toward the head end system indicating the power down status of the monitored node. In some embodiments, the frequency of sending a message to the HES is configurable. The method 300 ends at step 320.

Figure 4:
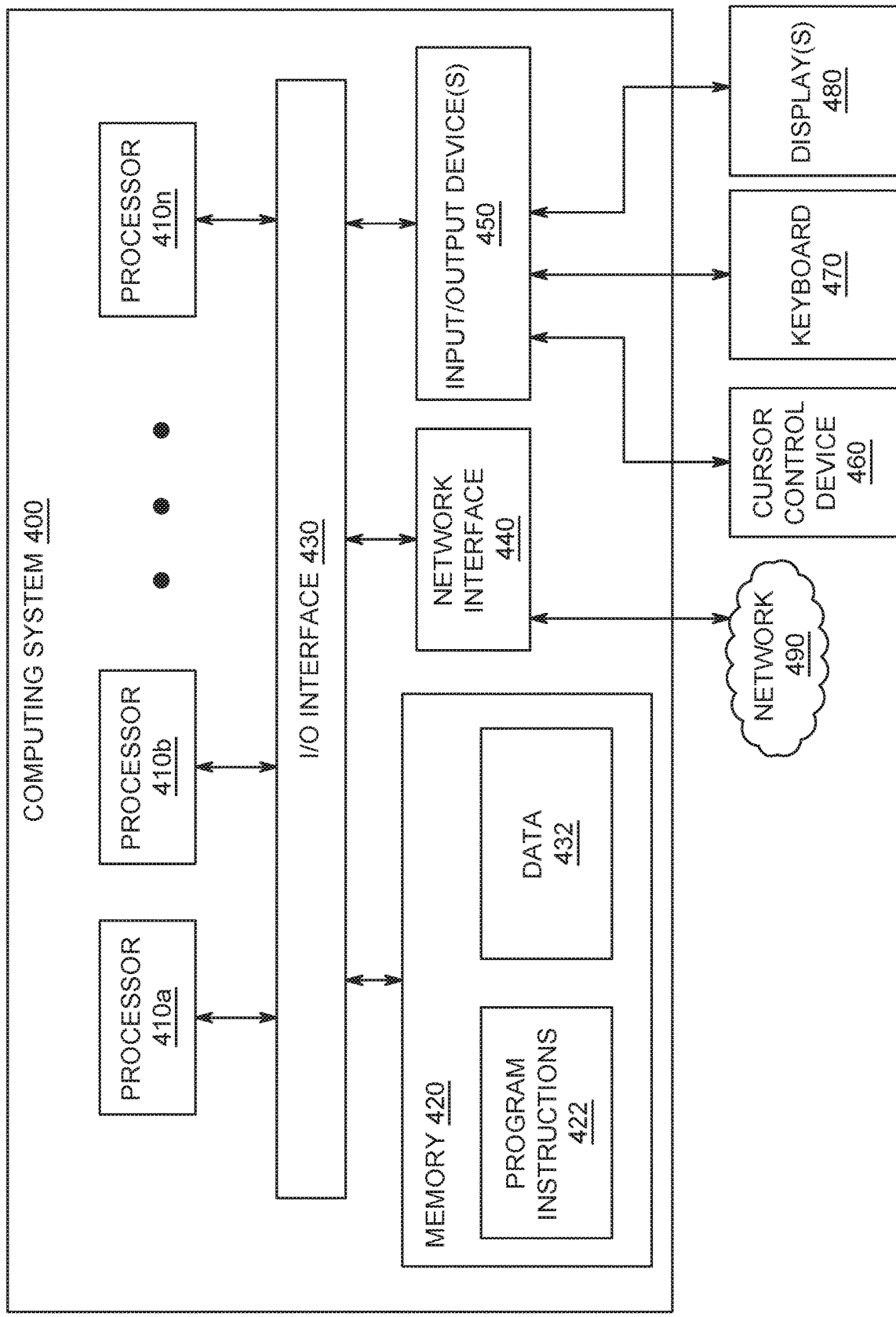
FIG. 4 depicts a computer system that can be utilized in various embodiments of the present invention to implement the computer and/or the display, according to one or more embodiments of the invention.

FIG. 4 depicts a computer system 400 that can be utilized in various embodiments of the present invention to implement the computer and/or the display, according to one or more embodiments.

Various embodiments of method and apparatus for organizing, displaying and accessing contacts in a contact list, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement the method 300 as processor-executable executable program instructions 422 (e.g., program instructions executable by processor(s) 410) in various embodiments.

In the illustrated embodiment, computer system 400 includes one or more processors 410a-410n coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of the components may be utilized by the system to receive user input described above. In various embodiments, a user interface may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). The network interface 440 functionality may include a load balancer that distributes the event reporting load over the processors 410. The ability to scale the number of processors enables the computer system 400 to handle event reports from large numbers of devices. Processors 410 may be any suitable processor capable of executing instructions. For example, in various embodiments processors 410 may be general-purpose or embedded processors implementing any of a variety of instruction set architectures (ISAs). In multiprocessor systems, each of processors 410 may commonly, but not necessarily, implement the same ISA.

System memory 420 may be configured to store program instructions 422 and/or data 432 accessible by processor 410. The data stored in 432 may include the reporting device's keys used for the key hash function. In this case is it is advisable to protect this data by encrypting it. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the operations and methods described above. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

The invention claimed is:

1. A computer implemented method for reporting power down events in mesh nodes without a backup energy storage device comprising:
listening, by a powered node in a network, for a heartbeat of a neighboring node, wherein the neighboring node does not have a backup energy storage device;
pinging the neighboring node when a heartbeat is not heard within a predefined time period;
failing to receive a response to the ping from the neighboring node;
in response to failing to receive the response to the ping, determining a number of communication failures that are acceptable for the neighboring node before a true failure is declared;
continue pinging the neighboring node until the neighboring node responds or until the acceptable number of communication failures has been reached, wherein the acceptable number of communications failures is a preconfigured number specific to the neighboring node based on historic response times of the neighboring node;
determining the neighboring node has experienced a power down event when the acceptable number of communication failures has been reached and the neighboring node has failed to respond; and
sending, by the powered node, a message toward a head end server indicating a power down event of the neighboring node.

2. The method of claim 1, further comprising determining by the powered node one or more neighboring nodes that do not have a backup energy storage device.

3. The method of claim 1, further comprising:
monitoring the network, by the powered node for a disturbance on the network; and
pinging the neighboring node when a disturbance is detected.

4. The method of claim 3, wherein a disturbance is one of an indication of a power failure from a node on the network or a failure to receive an expected acknowledgement from a node on the network.

5. The method of claim 1, wherein the indication of whether a node has a power supply and the acceptable number of communication failures for a given node is maintained by the powered node in a table of neighboring nodes.

6. The method of claim 1, wherein the acceptable number of communication failures for a node is based on previous response times for the node.

7. The method of claim 1, wherein the powered node is one of a smart meter, an Internet of Things device, a Bluetooth device, or an Industrial Internet of Things device.

8. A system for reporting power down events in mesh nodes without a backup energy storage device, comprising:
a plurality of devices, wherein each device comprises:
a) at least one processor;
b) at least one input device; and
c) at least one storage device storing processor-executable instructions which, when executed by the at least one processor, perform a method including:
listening, by a powered node in a network, for a heartbeat of a neighboring node, wherein the neighboring node does not have a backup energy storage device;
pinging the neighboring node when a heartbeat is not heard within a predefined time period;
failing to receive a response to the ping from the neighboring node;
in response to failing to receive the response to the ping, determining a number of communication failures that are acceptable for the neighboring node before a true failure is declared;
continue pinging the neighboring node until the neighboring node responds or until the acceptable number of communication failures has been reached;
determining the neighboring node has experienced a power down event when the acceptable number of communication failures has been reached and the neighboring node has failed to respond, wherein the acceptable number of communications failures is a preconfigured number specific to the neighboring node based on historic response times of the neighboring node; and
sending, by the powered node, a message toward a head end server indicating a power down event of the neighboring node.

9. The system of claim 8, further comprising determining by the powered node one or more neighboring nodes that do not have a backup energy storage device.

10. The system of claim 8, further comprising:
monitoring the network, by the powered node for a disturbance on the network; and
pinging the neighboring node when a disturbance is detected.

11. The system of claim 10, wherein a disturbance is one of an indication of a power failure from a node on the network or a failure to receive an expected acknowledgement from a node on the network.

12. The system of claim 8, wherein the indication of whether a node has a power supply and the acceptable number of communication failures for a given node is maintained by the powered node in a table of neighboring nodes, and wherein the acceptable number of communication failures for a node is based on previous response times for the node.

13. The system of claim 8, wherein the powered node is one of a smart meter, an Internet of Things device, a Bluetooth device, or an Industrial Internet of Things device.

14. A non-transitory computer readable medium for storing computer instructions that, when executed by at least one processor causes the at least one processor to perform a method for reporting power down events in mesh nodes without a backup energy storage device, comprising:
listening, by a powered node in a network, for a heartbeat of a neighboring node, wherein the neighboring node does not have a backup energy storage device;
pinging the neighboring node when a heartbeat is not heard within a predefined time period;
failing to receive a response to the ping from the neighboring node;
in response to failing to receive the response to the ping, determining a number of communication failures that are acceptable for the neighboring node before a true failure is declared, wherein the acceptable number of communications failures is a preconfigured number specific to the neighboring node based on historic response times of the neighboring node;
continue pinging the neighboring node until the neighboring node responds or until the acceptable number of communication failures has been reached;

determining the neighboring node has experienced a power down event when the acceptable number of communication failures has been reached and the neighboring node has failed to respond; and sending, by the powered node, a message toward a head end server indicating a power down event of the neighboring node.

15. The non-transitory computer readable medium of claim 14, further comprising determining by the powered node one or more neighboring nodes that do not have a backup energy storage device.

16. The non-transitory computer readable medium of claim 14, further comprising:

monitoring the network, by the powered node for a disturbance on the network; and pinging the neighboring node when a disturbance is detected.

17. The non-transitory computer readable medium of claim 16, wherein a disturbance is one of an indication of a power failure from a node on the network or a failure to receive an expected acknowledgement from a node on the network.

* * * * *